(12) United States Patent
Chang (10) Patent No.: US 10,202,869 B2
(45) Date of Patent: Feb. 12, 2019

(54) CONNECTION FOR A FAIRING IN A MID-TURBINE FRAME OF A GAS TURBINE ENGINE

(71) Applicant: United Technologies Corporation, Hartford, CT (US)

(72) Inventor: Hoyt Y. Chang, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 24 days.

(21) Appl. No.: 14/912,995

(22) PCT Filed: Aug. 12, 2014

(86) PCT No.: PCT/US2014/050640
§ 371 (c)(1),
(2) Date: Feb. 19, 2016

(87) PCT Pub. No.: WO2015/065563
PCT Pub. Date: May 7, 2015

(65) Prior Publication Data
US 2016/0201515 A1 Jul. 14, 2016

Related U.S. Application Data

(60) Provisional application No. 61/868,796, filed on Aug. 22, 2013.

(51) Int. Cl.
*F01D 25/24* (2006.01)
*F01D 9/04* (2006.01)
(Continued)

(52) U.S. Cl.
CPC .......... *F01D 25/246* (2013.01); *F01D 9/041* (2013.01); *F01D 25/28* (2013.01); *F02C 3/04* (2013.01);
(Continued)

(58) Field of Classification Search
CPC .......... F02C 7/20; F01D 25/246; F01D 25/28; F05D 2300/6033; F05D 2240/14; B32B 3/10
See application file for complete search history.

(56) References Cited

U.S. PATENT DOCUMENTS 4,793,770 A 12/1988 Schonewald et al.
2003/0091788 A1* 5/2003 Schroder ............... F16C 33/043
428/137

(Continued)

FOREIGN PATENT DOCUMENTS

WO WO2013/030498 A2 3/2013

OTHER PUBLICATIONS

International Search Report and Written Opinion from PCT Application Serial No. PCT/US2014/050640, dated May 19, 2015, 15 pages.

*Primary Examiner* — Carlos A Rivera
*Assistant Examiner* — Thuyhang Nguyen
(74) *Attorney, Agent, or Firm* — Kinney & Lange, P.A.

(57) ABSTRACT

A fairing assembly for a gas turbine engine includes an inner fairing platform; an outer fairing platform located radially outward of the inner fairing platform; a plurality of vanes radially outward from the inner fairing platform between the inner fairing platform and outer fairing platform; a mount located on a radially outer side of the outer fairing platform, the mount attached to the outer fairing platform on the radially outer side; and a link that includes an elongated member with a first end and an opposite second end, the first end configured to fit within the mount and define a pivot axis of the link with respect to the mount.

19 Claims, 4 Drawing Sheets

(51) Int. Cl.
 *F02C 3/04* (2006.01)
 *F01D 25/28* (2006.01)
 *F02C 7/20* (2006.01)

(52) U.S. Cl.
 CPC ............ *F02C 7/20* (2013.01); *F05D 2220/32* (2013.01); *F05D 2240/14* (2013.01); *F05D 2240/35* (2013.01); *F05D 2300/6033* (2013.01); *Y02T 50/672* (2013.01)

(56) References Cited

U.S. PATENT DOCUMENTS

| | | | |
|---|---|---|---|
| 2003/0161727 A1 | 8/2003 | MacLean et al. | |
| 2005/0076504 A1* | 4/2005 | A. Morrison | F01D 5/282 29/889.72 |
| 2007/0068136 A1* | 3/2007 | Cameriano | F01D 5/147 60/200.1 |
| 2010/0290903 A1* | 11/2010 | Heyerman | B64D 27/26 415/213.1 |
| 2011/0000223 A1 | 1/2011 | Russberg | |
| 2012/0243984 A1 | 9/2012 | Rishton et al. | |
| 2012/0286126 A1* | 11/2012 | Gallet | F01D 25/162 248/554 |
| 2015/0021455 A1* | 1/2015 | Mandel | F02C 7/32 248/554 |

\* cited by examiner

CONNECTION FOR A FAIRING IN A MID-TURBINE FRAME OF A GAS TURBINE ENGINE

BACKGROUND

The present invention relates generally to aircraft and, in particular, to a fairing used to direct the flow of air between a high-pressure turbine and a low-pressure turbine in a gas turbine engine.

A gas turbine engine may be used to power various types of vehicles and systems. In some gas turbine engines, the turbine section is implemented with one or more annular turbines, such as a high-pressure turbine and a low-pressure turbine. The high-pressure turbine may be positioned upstream of the low-pressure turbine and configured to drive a high-pressure compressor, while the low-pressure turbine is configured to drive a low-pressure compressor and/or a fan. The two turbines are usually arranged such that the flow exits the high-pressure turbine and is directed into the low-pressure turbine. This flow is directed by a fairing, which is subject to the high-temperature air exiting the high-pressure turbine upstream of the fairing. The fairing is secured to structural components within the mid-turbine frame, such as an outer case, to keep the fairing situated between the two turbines.

As with any system aboard an aircraft, there is great value in an improved fairing and its connection to support members that includes innovative components designed to improve the operational efficiency of the system and/or to reduce weight.

SUMMARY

A fairing assembly for a gas turbine engine can include an inner fairing platform; an outer fairing platform located radially outward of the inner fairing platform; a plurality of vanes radially outward from the inner fairing platform between the inner fairing platform and outer fairing platform; a mount located on a radially outer side of the outer fairing platform, the mount attached to the outer fairing platform on the radially outer side; and a link that includes an elongated member with a first end and an opposite second end, the first end configured to fit within the mount and define a pivot axis of the link with respect to the mount.

DETAILED DESCRIPTION

Figure 1:
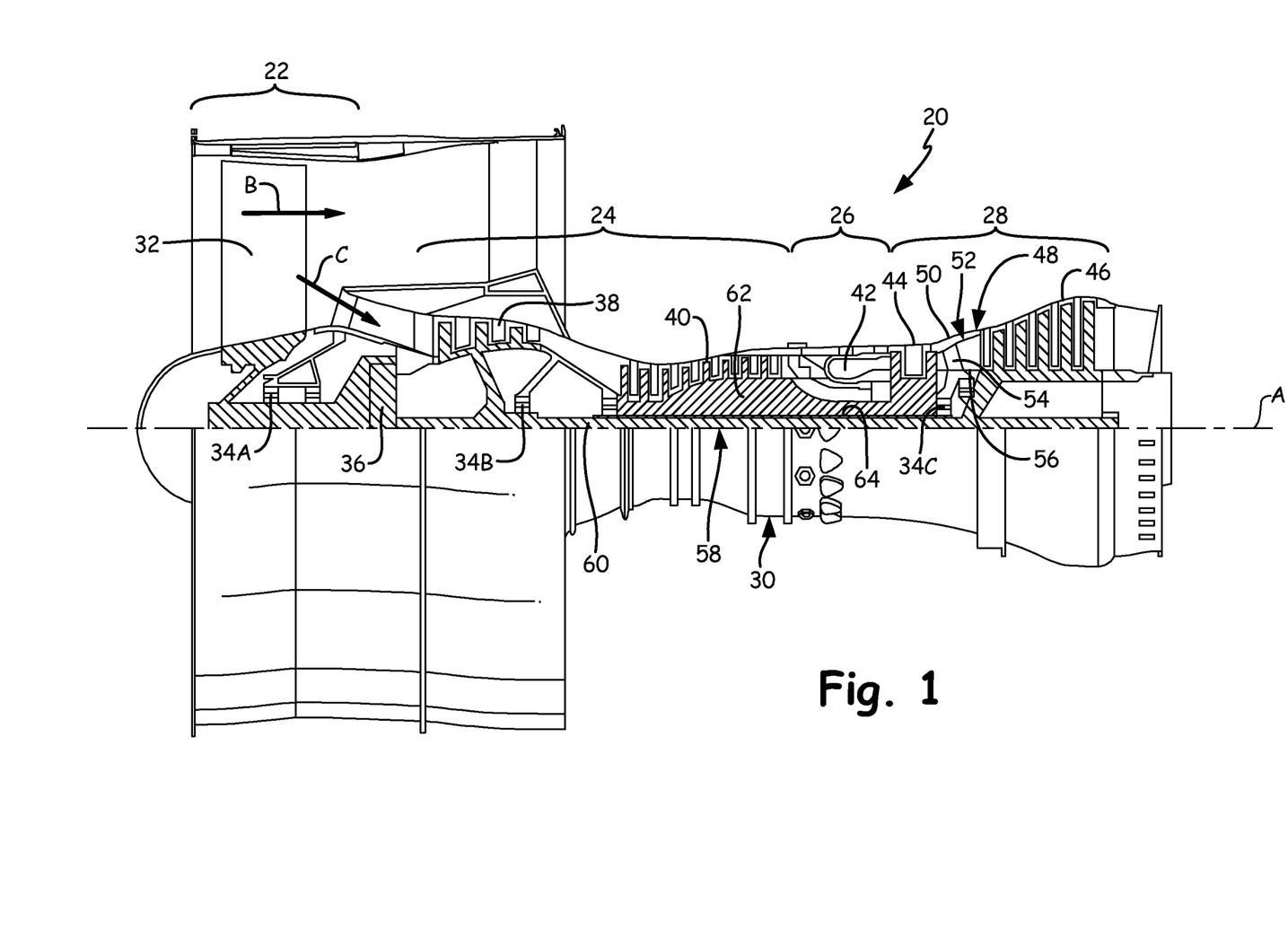
FIG. 1 is a partial side cross-section view of a gas turbine engine.

FIG. 1 is a partial cross-section view of a gas turbine engine. Gas turbine engine 20 may include fan section 22, compressor section 24, combustor section 26, and turbine section 28. Compressor section 24, combustor section 26, and turbine section 28 form engine static structure 30. Within fan section 22 is fan 32, at least one bearing system 34A, geared drive architecture 36, an inlet to bypass flow path B, and an inlet to core flow path C. Compressor section 24 includes low-pressure compressor 38 and high-pressure compressor 40. Combustor section 26 includes combustor 42. Turbine section 28 includes high-pressure turbine 44, low-pressure turbine 46, and mid-turbine frame 48. Mid-turbine frame 48 includes outer casing 50 and fairing 52. Fairing 52 includes vanes 54 and fairing platform 56. Along engine central longitudinal axis A is low-pressure spool 58 and high-pressure spool 62. Low-pressure spool 58 includes low-pressure compressor 38, low-pressure turbine 46, and inner shaft 60 supported by bearing system 34B. High-pressure spool 62 includes high-pressure compressor 40, high-pressure turbine 44, and outer shaft 64 supported by bearings 34C. Geared drive architecture 36 is coupled to inner shaft 60 of low-pressure spool 58.

Fan 32 drives air along bypass flow path B, while compressor section 24 draws air in along core flow path C where air is compressed and communicated to combustor section 26. In combustor section 26, air is mixed with fuel and ignited to generate a high-pressure, high-temperature exhaust gas stream that expands through turbine section 28 where energy is extracted and utilized to drive fan section 22, compressor section 24, and/or other engine loads.

Gas turbine engine 20 generally includes low-pressure spool 58 and high-pressure spool 62 mounted for rotation about engine central longitudinal axis A relative to engine static structure 30 via several bearing systems 34A-34C. It should be understood that various bearing systems at various locations may alternatively or additionally be provided.

Inner shaft 60 of low-pressure spool 58 connects fan 32 and low-pressure compressor 38 to low-pressure turbine 46. In a geared architecture, inner shaft 60 drives fan 32 through a speed change device, such as geared drive architecture 36, to drive fan 32 at a lower speed than low-pressure spool 58. High-pressure spool 62 includes outer shaft 64 that interconnects high-pressure compressor 40 and high-pressure turbine 42. Inner shaft 60 and outer shaft 64 are concentric and rotate via bearing systems 34A-34C about engine central longitudinal axis A.

Combustor 42 is arranged between high-pressure compressor 40 and high-pressure turbine 44. In one example, high-pressure turbine 44 includes at least two stages. In another example, high-pressure turbine 44 includes only a single stage.

Mid-turbine frame 48 is arranged generally between high-pressure turbine 44 and low-pressure turbine 46. Mid-turbine frame 48 supports bearing system 34C in turbine section 28 and other components within the core of engine static structure 30. Fairing 52 is the component of mid-turbine frame 48 that is in contact with airflow of core flow path C. Fairing 52 guides airflow through core flow path C from high-pressure turbine 44 to low-pressure turbine 46. Outer casing 50 is located radially outward from fairing 52 and provides a structural member to which fairing 52 and other components of mid-turbine frame 48 can be connected (discussed in further detail with regards to FIGS. 2A, 2B, 3, 4, and 5).

While the disclosure focuses on an engine with two turbines, a configuration utilizing mid-turbine frame 48 and fairing 52 may be implemented in a three-spool engine with mid-turbine frame 48 and fairing 52 being located between a high-pressure turbine and an intermediate-pressure turbine and/or between an intermediate-pressure turbine and a low-pressure turbine.

Airflow through core airflow path C is first compressed by low-pressure compressor 38, and then compressed by high-pressure compressor 40. After being compressed by high-pressure compressor 40, the airflow is mixed with fuel and ignited in combustor 42 to produce high-pressure, high-temperature exhaust gases. The high-pressure, high-temperature exhaust gases are then expanded through high-pressure turbine 44 and low-pressure turbine 46. Between high-pressure turbine 44 and low-pressure turbine 46 along core airflow path C is fairing 52, which includes vanes 54 and fairing platform 56. Vanes 54 are in core airflow path C and function as an inlet guide vane for low-pressure turbine 46. Outer fairing platform 56a and inner fairing platform 56b (collectively fairing platform 56) line airflow path C and guide the airflow along fairing 52 to low-pressure turbine 46. Fairing 52 is described in greater detail below.

Figure 2A:
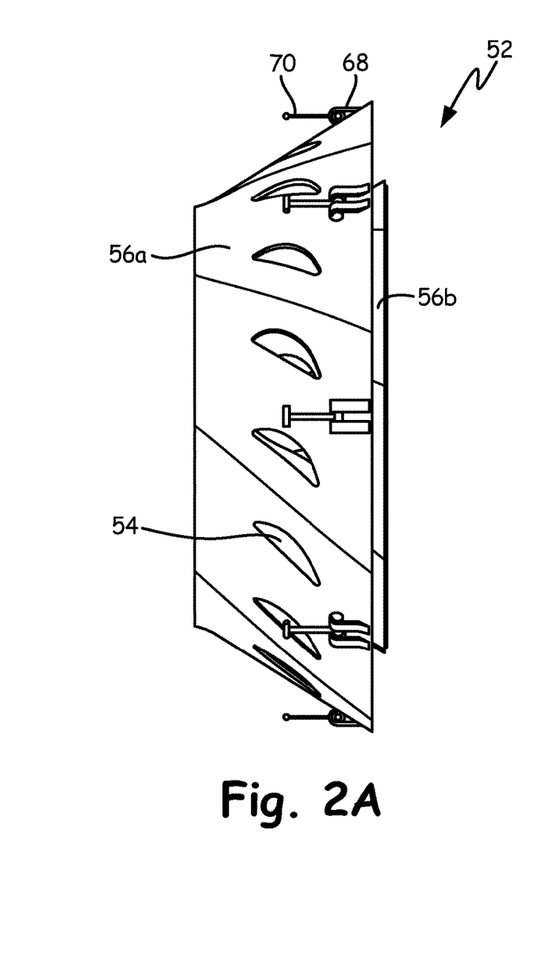
FIG. 2A is a side elevation view of a fairing, including a mount and link assembly.
Figure 2B:
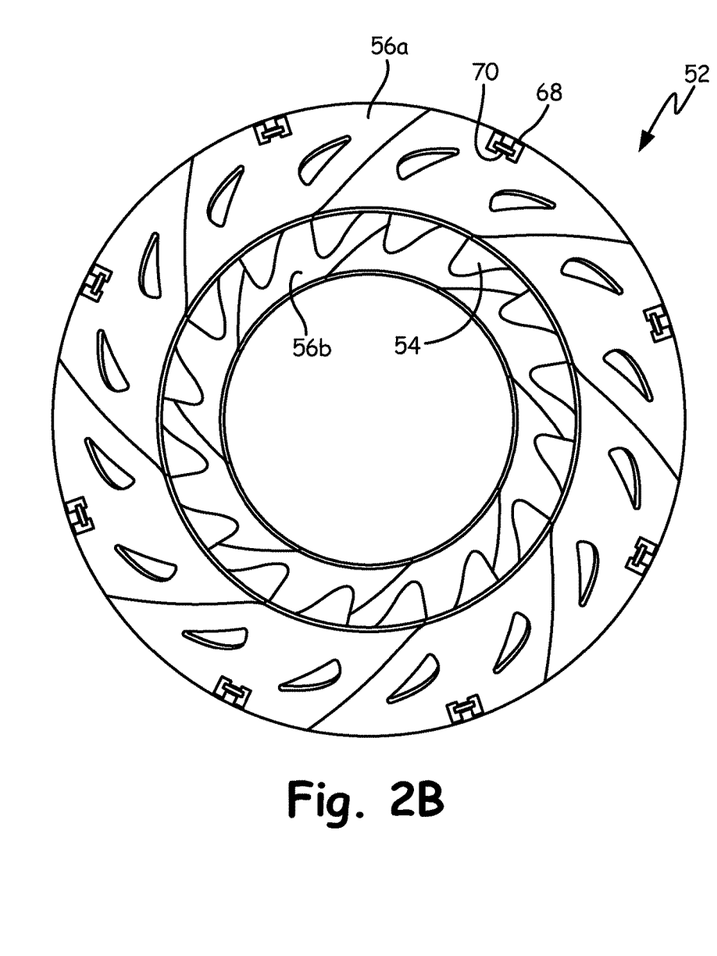
FIG. 2B is a front elevation view of the fairing, including the mount and link assembly.

FIG. 2A is a side elevation view of a fairing, including a mount and link assembly, while FIG. 2B is a front elevation view of the fairing, including the mount and link assembly. Fairing 52 of FIGS. 2A and 2B include vanes 54, outer fairing platform 56a, inner fairing platform 56b, mount 68, and link 70.

Fairing 52 has two rings, with inner fairing platform 56b forming the radially innermost ring. Attached to a radially outer side of inner fairing platform 56b are vanes 54, which extend radially outward from inner fairing platform 56b. Vanes 54, extending radially outward, attach on the outer ends of vanes 54 to an inner side of outer fairing platform 56a. Outer fairing platform 56a forms the outermost ring of fairing 52 and is configured to completely attach to the outer end of each of vanes 54. Located on the radially outer side of outer fairing platform 56a is mount 68 and link 70. Mount 68 can be attached to outer fairing platform 56a at two points to form an attachment within which link 70 attaches to mount 68. The number of mounts 68 and links 70 may vary depending on the loading on and support needed for fairing 52. Link 70 can have a T-shaped section located at its end that engages mount 68 to efficiently and effectively connect with mount 68. The other end of link 70 is configured to connect with outer casing 50 (shown in FIG. 1).

As is seen most easily in FIG. 2A, outer fairing platform 56a and inner fairing platform 56b can angle radially outward as they extend axially from the upstream end of fairing 52 (adjacent high-pressure turbine 44) to the downstream end of fairing 52 (adjacent low-pressure turbine 46). The upstream end of outer fairing platform 56a and inner fairing platform 56b attach to high-pressure turbine 44, while the downstream end of outer fairing platform 56a and inner fairing platform 56b attach to low-pressure turbine 46. In this embodiment, outer fairing platform 56a and inner fairing platform 56b to angle radially outward as fairing 52 extends axially downstream towards low-pressure turbine 46 because high-pressure turbine 44 is radially closer to engine central longitudinal axis A than low-pressure turbine 46.

Vanes 54 connect inner fairing platform 56b to outer fairing platform 56a and guide the airflow through fairing 52. To reduce weight and allow access for support members and other lines to the components radially within inner fairing platform 56b, vanes 54 can be hollow and there can be openings in the section where vanes 54 connect to outer fairing platform 56a and inner fairing platform 56b. If there are openings in outer fairing platform 56a and inner fairing platform 56b, the openings would only be positioned where vanes 54 connect to outer fairing platform 56a and inner fairing platform 56b and would not allow the airflow to exit core flow path C. The number of vanes 54 can vary in different embodiments, with the number of vanes 54 and pitch of each vane configured to provide support to inner fairing platform 56b, allow access to components radially within inner fairing platform 56b, and most efficiently guide the airflow between high-pressure turbine 44 and low-pressure turbine 46.

In an effort to reduce weight and increase operational longevity of fairing 52 (including vanes 54, outer fairing platform 56a, inner fairing platform 56b, and mount 68), fairing 52 may be made of various materials, including a ceramic matrix composite ("CMC"). The use of a CMC for fairing 52 is advantageous, for CMCs have higher thermal capabilities than other commonly used materials for fairing 52, such as metal. Higher thermal capabilities for fairing 52 are beneficial because fairing 52 is in contact with the heated airflow in core flow path C coming from high-pressure turbine 44. Also, CMCs are much lighter than metal, which reduces weight and operational costs of the aircraft due to increased efficiency. The use of a CMC for vanes 54, outer fairing platform 56a, and inner fairing platform 56b brings about the issue of thermal expansion, which can cause fairing 52 to expand radially outward from engine central longitudinal axis A towards outer casing 50. Because outer casing 50 is generally made of a different material than fairing 52, such as metal, and is not subject to the high temperature airflow of core flow path C coming from high-pressure turbine 44, outer casing 50 will expand due to thermal expansion at a different rate and to a different degree than fairing 52. Thus, the connection between fairing 52 (more specifically outer fairing platform 56a) and outer casing 50 must be configured to handle these issues. This connection (which includes a mount and link assembly) is discussed in further detail below.

Figure 3:
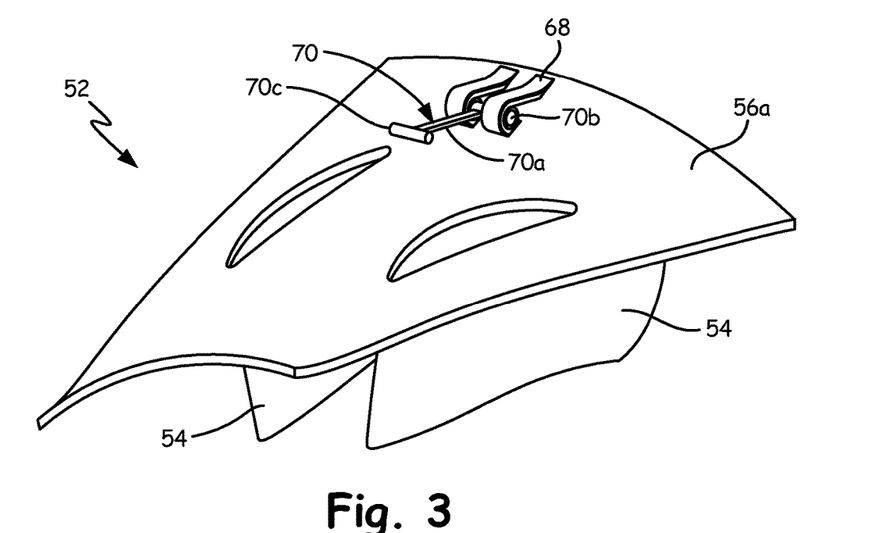
FIG. 3 is a perspective view of a segment of the fairing showing the mount and link assembly.
Figure 4:
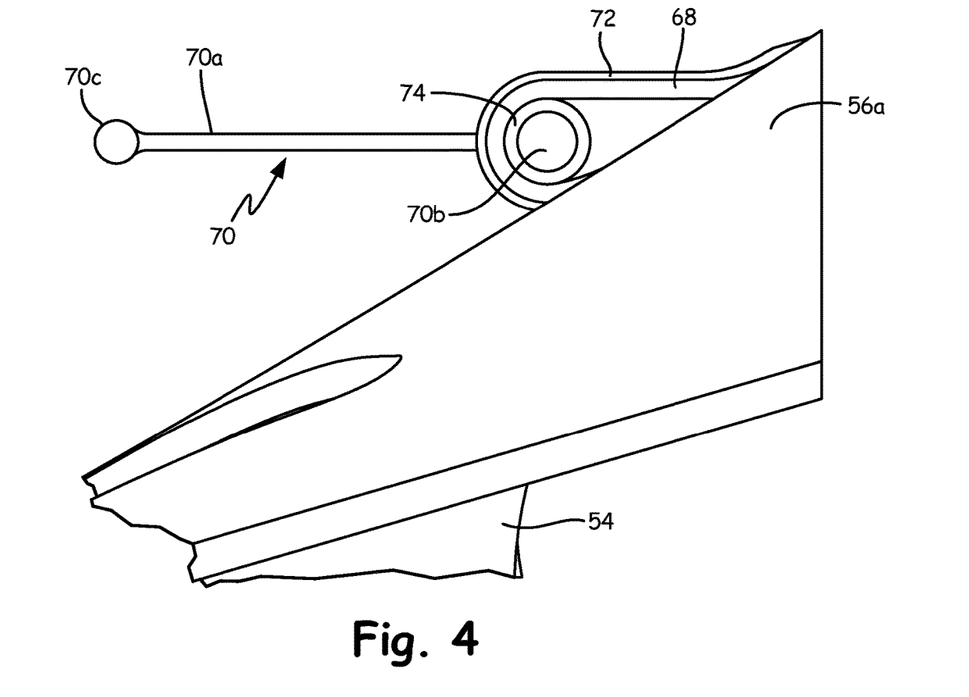
FIG. 4 is a side elevation view of a segment of the fairing showing the mount and link assembly.

FIG. 3 is a perspective view of a segment of fairing 52 showing the mount and link assembly, while FIG. 4 is a side elevation view of a segment of fairing 52 showing the mount and link assembly. FIG. 3 shows a portion of fairing 52, with segments of vanes 54, segments of outer fairing platform 56a, mount 68, and link 70. Inner fairing platform 56b is not shown in FIGS. 3 and 4. FIG. 4 shows the additional elements of mount overwrap 72 and loop bushing 74.

As discussed previously with relation to FIGS. 2A and 2B, vanes 54 are radially inward of outer fairing platform 56a and attach to the inner side of outer fairing platform 56a. To support fairing 52, mount 68 and link 70 are used to connect outer fairing platform 56a to outer casing 50 (shown in FIG. 1). Link 70 includes elongated member 70a, T-shaped first end 70b, and T-shaped second end 70c. For additional strength, mount overwrap 72 can wrap around the outer side of mount 68 and can be made from the same material as mount 68, such as a CMC. On the inner side of mount 68 surrounding T-shaped first end 70b of link 70 can be loop bushing 74, which is to provide a wear surface to prevent wear on mount 68 and T-shaped first end 70b of link 70. Loop bushing 74 can be made from a variety of materials, including the same material as mount 68 or link 70.

Mount 68 can be attached to outer fairing 56a through various configurations, including having both the outer fairing platform 56a and mount 68 made from the same material (such as a CMC) and molded at the same time to blend into outer fairing platform 56a. Mount 68 can be in a loop with one end extending relatively horizontal to attach to outer fairing platform 56a and the other end curving approximately semicircular until it attaches to fairing platform 56a. Such a configuration is advantageous when mount 68 is a CMC, which has a high tensile strength but low inter-laminar strength, because it places the loading stress on mount 68 due to the loads on link 70 in the axial (tensile) direction.

To increase strength, mount overwrap 72 can be attached to the outer surface of mount 68 and additionally attached at the ends to outer fairing platform 56a near the location where mount 68 attaches to outer fairing platform 56a. Mount overwrap 72 can be made from various materials, including the same material as mount 68 and/or outer fairing platform 56a (such as a CMC) so the attachment of mount overwrap 72 to mount 68 and/or outer fairing platform 56a can be formed by molding the components at the same time and blending the components together.

Link 70 connects mount 68 to outer casing 50, with T-shaped first end 70b connected to mount 68 by being held within mount 68 to form a pivot axis, and T-shaped second end 70c connected to outer casing 50. Link 70 can be positioned substantially horizontal, extending axially between outer casing 50 and mount 68, and can be configured to allow rotation within mount 68 so as to effectively allow for thermal expansion of fairing 52 in the radial direction while maintaining a structure to carry axial loads to outer casing 50.

Because link 70 can rotate within mount 68, loop bushing 74 may be used to reduce wear on mount 68 and link 70 (more specifically T-shaped first end 70b). Loop bushing 74 can be bound to T-shaped first end 70b of link 70, therefore rotating with link 70 and defining a wear surface between loop bushing 74 and mount 68. Loop bushing 74 can alternately be bound to mount 68, therefore remaining stationary while link 70 rotates. This configuration defines a wear surface between loop bushing 74 and T-shaped first end 70b of link 70. The configuration of loop bushing 74 depends on a number of factors, such as the material of mount 68, the material of link 70, and the material of loop bushing 74. As mentioned above, loop bushing 74 can be made from a variety of materials, including a CMC, configured to handle wear without causing damage to surrounding components. The use of loop bushing 74 is also advantageous because loop bushing 74 may be replaced after it has become ineffective due to wear, avoiding the cost of replacing other fairing 52 components, such as outer fairing 56a, mount 68, and/or link 70.

The configuration of mount 68 and link 70 is important because it allows radial movement due to thermal expansion while preventing axial movement. Also, the configuration of mount 68 and link 70, along with mount overwrap 72, causes the loading on mount 68 to be tensile, which is the direction of strength for a fiber CMC. While FIGS. 2A, 2B, 3, and 4 show mount 68 made up of two loops with the end of link 70 in a T-shape, other configurations can be utilized, including the use of one loop as is seen in FIG. 5.

Figure 5:
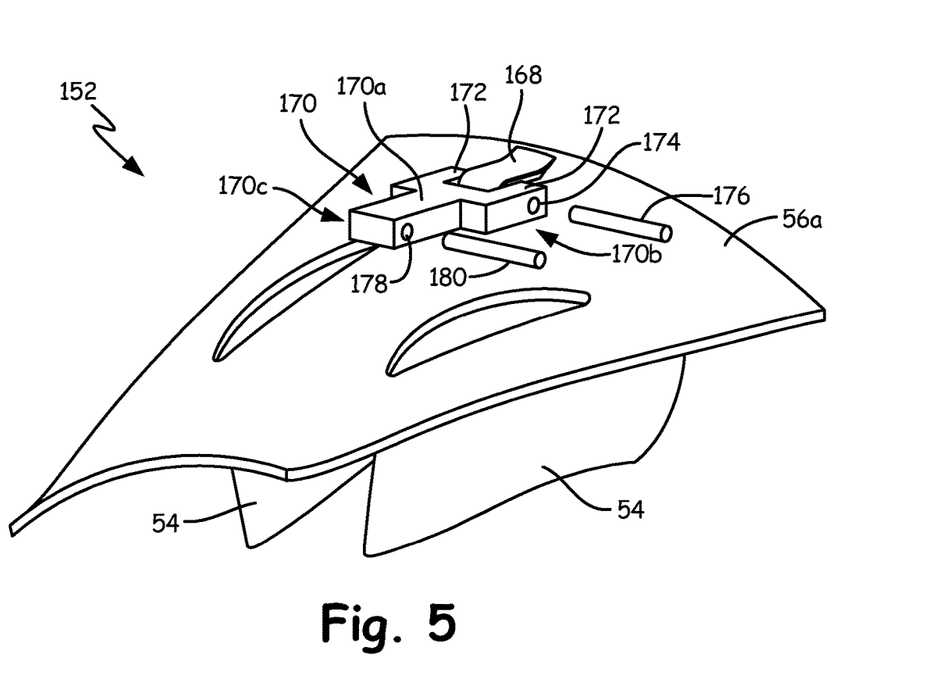
FIG. 5 is a perspective view of a segment of the fairing showing an alternate embodiment of the mount and link assembly.

FIG. 5 is a perspective view of a segment of fairing 152 showing an alternate embodiment of the mount and link assembly. FIG. 5 shows a segment of vanes 54, a segment of outer fairing platform 56a, mount 168 with only one loop, and link 170 with an alternate configuration. Link 170 has a Y-shaped configuration with elongated member 170a, first end 170b, and second end 170c. First end 170b includes a pair of spaced arms 172, holes 174, and pin 176. Second end 170c includes hole 178 and pin 180.

Mount 168 and link 170 can have a number of different configurations suited to fit the needs of the connection. In this embodiment, mount 168 is one loop that can be wider than the individual loops of the embodiment shown in FIGS. 2A, 2B, 3, and 4, but does not have to be wider if the connection between mount 168 and outer fairing platform 56a is sufficiently strong. Mount 168 can be attached to outer fairing platform 56a through various methods, including the same methods as discussed with regards to mount 68 in FIGS. 3 and 4. Mount 168 can be constructed from various materials, such as a CMC. While not shown in FIG. 5, mount overwrap 72 and loop bushing 74 can be used with this embodiment or other embodiments not specifically discussed.

Link 170 forms the connection with mount 168 by pin 176 that extends between arms 172 on both sides of mount 168. Pin 176 is held at opposite ends in arms 172 and forms the pivot axis upon which link 170 rotates with respect to mount 168. Pin 176 can be surrounded by loop bushing 74 (shown in FIG. 4) to reduce wear. Second end 170c of link 170 can be configured in various ways to effectively and efficiently attach to a support member, such as outer casing 50 (shown in FIG. 1). As shown in FIG. 5, pin 180 extends through hole 178 and extends beyond each side of second end 170c to provide a connection of link 170 to a support member.

Discussion of Possible Embodiments

The following are non-exclusive descriptions of possible embodiments of the present invention.

A fairing assembly for a gas turbine engine can include an inner fairing platform; an outer fairing platform located radially outward of the inner fairing platform; a plurality of vanes radially outward from the inner fairing platform between the inner fairing platform and outer fairing platform; a mount located on a radially outer side of the outer fairing platform, the mount attached to the outer fairing platform on the radially outer side; and a link that includes an elongated member with a first end and an opposite second end, the first end configured to fit within the mount and define a pivot axis of the link with respect to the mount.

The fairing assembly of the preceding paragraph can optionally include, additionally and/or alternatively, any one or more of the following features, configurations, and/or additional components.

The second end of the link attaches to an outer casing.

A bushing adjoins the first end of the link.

The bushing is constructed from a ceramic matrix composite.

The mount includes an at least one loop connected to the fairing platform at two points.

The mount includes two substantially identical loops and the first end of the link has two arms substantially perpendicular to the elongated member, a first arm configured to fit within a first loop and a second arm configured to fit within a second loop, the two arms defining a pivot axis of the link with respect to the mount.

The ceramic matrix composite layer is located on an outer surface of the mount.

The mount is constructed from a ceramic matrix composite.

The outer fairing platform and vane are constructed from a ceramic matrix composite.

The outer fairing platform and mount are constructed from one continuous piece.

A gas turbine engine can include a compressor; a combustor downstream of the compressor; a plurality of turbines downstream of the combustor; and a fairing located between the plurality of turbines that can include an inner fairing platform; an outer fairing platform located radially outward of the inner fairing platform; a plurality of vanes radially outward from the inner fairing platform between the inner fairing platform and outer fairing platform; a mount located on a radially outer side of the outer fairing platform, the mount attached to the outer fairing platform on the radially outer side; and a link that includes an elongated member with a first end and an opposite second end, the first end configured to fit within the mount and define a pivot axis of the link with respect to the mount.

The gas turbine engine of the preceding paragraph can optionally include, additionally and/or alternatively, any one or more of the following features, configurations, and/or additional components.

A bushing adjoins the first end of the link.

A ceramic matrix composite layer is adjoined to an outer surface of the mount.

The mount is constructed from a ceramic matrix composite.

The outer fairing platform, the inner fairing platform, and the plurality of vanes are constructed from a ceramic matrix composite.

The outer fairing platform and the mount are constructed from one continuous piece.

A fairing can include an inner fairing platform; an outer fairing platform and located radially outward of the inner fairing platform; at least one vane radially outward from the inner fairing platform between the inner fairing platform and outer fairing platform; and a mount located on the radially outer side of the outer fairing platform, the mount includes at least one loop having a first end and a second end, the first end extending substantially axial to attach to the outer fairing platform, the second end curving to attach to the outer fairing platform.

The fairing of the preceding paragraph can optionally include, additionally and/or alternatively, any one or more of the following features, configurations, and/or additional components.

The inner fairing platform, the outer fairing platform, the at least one vane, and the mount are constructed from a ceramic matrix composite.

The outer fairing platform and the mount are constructed from one continuous piece.

A ceramic matrix composite layer is adjoined to an outer surface of the at least one loop of the mount.

Any relative terms or terms of degree used herein, such as "substantially," "essentially," "generally," "approximately," and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), the invention will be understood by those skilled in the art that various changes may be made and equivalents may be substituted for elements thereof without departing from the scope of the invention. For example, although a two-spool gas turbine engine has been described, other embodiments can include different spool configurations, such as a three-spool configuration. Similarly, some embodiments may not make use of a geared drive architecture to drive the fan. In addition, many modifications may be made to adapt a particular situation or material to the teachings of the invention without departing from the essential scope thereof. Therefore, it is intended that the invention not be limited to the particular embodiment(s) disclosed but that the invention will include all embodiments falling within the scope of the appended claims.

The invention claimed is:

1. A fairing assembly for a gas turbine engine, the assembly comprising:
   an inner fairing platform;
   an outer fairing platform located radially outward of the inner fairing platform;
   a plurality of vanes radially outward from the inner fairing platform between the inner fairing platform acid outer fairing platform;
   a mount located on a radially outer side of the outer fairing platform, the mount including at least one loop attached to the outer fairing platform on the radially outer side, the at least one loop including a first end extending relatively horizontal from the outer fairing platform towards a second end, the second end curving approximately semicircular until an attachment to the outer fairing platform; and
   a link that includes an elongated member with a first end and an opposite second end, the first end configured to fit within the mount and define a pivot axis of the link with respect to the mount.

2. The assembly of claim 1, wherein the second end of the link attaches to an outer casing.

3. The assembly of claim 1, wherein a bushing adjoins the first end of the link.

4. The assembly of claim 3, wherein the bushing is constructed from a ceramic matrix composite.

5. The assembly of claim 1, wherein the mount includes two substantially identical loops and the first end of the link has two arms substantially perpendicular to the elongated member, a first arm configured to fit within a first loop and a second arm configured to fit within a second loop, the two arms defining a pivot axis of the link with respect to the mount.

6. The assembly of claim 1, wherein a ceramic matrix composite layer is located on an outer surface of the mount.

7. The assembly of claim 1, wherein the mount is constructed from a ceramic matrix composite.

8. The assembly of claim 1, wherein the outer fairing platform and the vane are constructed from a ceramic matrix composite.

9. The assembly of claim 1, wherein the outer fairing platform and the mount are constructed from one continuous piece.

10. A gas turbine engine comprising:
    a compressor surrounding an axis;
    a combustor axially downstream of the compressor;
    a plurality of turbines axially downstream of the combustor; and
    a fairing located axially between two of the plurality of turbines, the fairing including:
    an inner fairing platform;
    an outer fairing platform located radially outward of the inner fairing platform;
    a plurality of vanes radially outward from the inner fairing platform between the inner fairing platform and outer fairing platform
    a mount located on a radially outer side of the outer fairing platform, the mount including at least one loop with a first end extending relatively horizontal from the outer fairing platform on the radially outer side towards a second end that is curved approximately semicircular until an attachment to the outer fairing platform on the radially outer side; and a link that includes an elongated member with a first end and an opposite second end, the first end configured to fit within the mount and define a pivot axis of the link with respect to the mount.

11. The assembly of claim 10, wherein a bushing adjoins the first end of the link.

12. The assembly of claim 10, wherein a ceramic matrix composite layer is adjoined to an outer surface of the mount.

13. The assembly of claim 10, wherein the mount is constructed from a ceramic matrix composite.

14. The assembly of claim 10, wherein the outer fairing platform, the inner fairing platform, and the plurality of vanes are constructed from a ceramic matrix composite.

15. The assembly of claim 10, wherein the outer fairing platform and the mount are constructed from one continuous piece.

16. A fairing comprising:

an inner fairing platform of a gas turbine engine;

an outer fairing platform and located radially outward of the inner fairing platform;

at least one vane radially outward from the inner fairing platform between the inner fairing platform and outer fairing platform; and a mount located on the radially outer side of the outer fairing platform, the mount includes at least one loop having a first end and a second end, the first end extending relatively horizontal from the outer fairing platform at a first contact area towards the second end curving approximately semicircular until an attachment to the outer fairing platform at a second contact area he second contact area.

17. The fairing of claim 16, wherein the inner fairing platform, the outer fairing platform, the at least one vane, and the mount are constructed from a ceramic matrix composite.

18. The fairing of claim 16, wherein the outer fairing platform and the mount are constructed from one continuous piece.

19. The fairing of claim 16, wherein a ceramic matrix composite layer is adjoined to an outer surface of the at least one loop of the mount.

\* \* \* \* \*